United States Patent
Cosky

(10) Patent No.: US 9,533,660 B2
(45) Date of Patent: Jan. 3, 2017

(54) RETAINER APPARATUS FOR USE WITH A PILOT CHUTE LAUNCHER AND METHOD FOR PACKING A PARACHUTE USING A PILOT CHUTE LAUNCHER AND RETAINER APPARATUS

(71) Applicant: Robert C. Cosky, Ellwood City, PA (US)

(72) Inventor: Robert C. Cosky, Ellwood City, PA (US)

( * ) Notice: Subject to any disclaimer, the term of this patent is extended or adjusted under 35 U.S.C. 154(b) by 214 days.

(21) Appl. No.: 14/537,119

(22) Filed: Nov. 10, 2014

(65) Prior Publication Data

US 2016/0129848 A1 May 12, 2016

(51) Int. Cl.
*B64D 17/40* (2006.01)
*B23Q 3/00* (2006.01)
*B60T 1/16* (2006.01)
*B64D 17/46* (2006.01)

(52) U.S. Cl.
CPC .................. *B60T 1/16* (2013.01); *B64D 17/40* (2013.01); *B64D 17/46* (2013.01); *B64D 2700/62543* (2013.01); *Y10T 24/45241* (2015.01); *Y10T 29/49822* (2015.01); *Y10T 29/49895* (2015.01); *Y10T 29/49899* (2015.01)

(58) Field of Classification Search
CPC .............. Y10T 24/1498; Y10T 24/153; Y10T 24/45241; Y10T 24/45246; Y10T 29/49815; Y10T 29/49817; Y10T 29/49822; Y10T 29/49895; Y10T 29/49899; B64D 17/40; B64D 17/42; B64D 17/44; B64D 17/46; B64D 17/52; B64D 2700/62543; B64D 2700/62517; B60T 1/16

USPC ....... 24/268, 269, 16 PB, 14, 145, 147, 148; 53/461, 207, 218
See application file for complete search history.

(56) References Cited

U.S. PATENT DOCUMENTS

| | | | | |
|---|---|---|---|---|
| 504,307 | A | * | 8/1893 | Roberts ...................... A45F 5/10 294/154 |
| 1,829,613 | A | * | 10/1931 | Sato ........................ B42F 13/08 24/16 PB |
| 2,316,895 | A | | 4/1943 | Smith |
| 2,335,589 | A | | 11/1943 | Fremeau |
| 2,452,604 | A | | 11/1948 | Selsmeyer |
| 2,543,064 | A | | 2/1951 | Roll |

(Continued)

OTHER PUBLICATIONS

Packing and Maintenance Manual for Stroud Safety Drag Chutes, pp. 1-11, www.stroudsafety.com, Oklahoma City, OK, US.

*Primary Examiner* — Essama Omgba
(74) *Attorney, Agent, or Firm* — Karen Tang-Wai Sutton

(57) ABSTRACT

An apparatus facilitating packing of a racecar parachute using a pilot chute launcher, the apparatus comprised of a slotted metal plate, a pair of notched tabs, and a pair of extensions selected to removably couple with the notched tabs and the plate. In use, the notched tabs, notched sides facing away from one another, are positioned and affixed to opposing sides of a parachute bag bottom plate. The parachute and pilot chute launcher are packed into the parachute bag. The extensions are inserted into opposing slots on the plate, and by engaging the extensions with the notched tabs, the pilot chute launcher is compressed. A top and a bottom flap of the parachute bag is secured over the plate in a usual fashion. The extensions and the plate are sequentially removed, and the parachute is continued to be packed in the usual fashion.

10 Claims, 12 Drawing Sheets

(56) References Cited

U.S. PATENT DOCUMENTS

| | | | |
|---|---|---|---|
| 2,959,098 A * | 11/1960 | Hassman | G02C 3/003 24/16 PB |
| 3,162,001 A | 12/1964 | Reynolds | |
| 3,515,372 A * | 6/1970 | Courville | A01G 23/099 144/193.1 |
| 3,913,179 A * | 10/1975 | Rhee | B65D 63/1027 24/16 PB |
| 3,944,033 A * | 3/1976 | Simson | A45C 13/26 190/117 |
| 4,502,192 A * | 3/1985 | Hess | A44B 11/2588 24/589.1 |
| 4,524,495 A * | 6/1985 | Hess | A44B 11/2588 24/593.1 |
| 5,125,599 A | 6/1992 | Sherman | |
| 6,704,971 B2 * | 3/2004 | Dossett | B65D 83/0088 24/16 PB |
| 6,973,700 B2 * | 12/2005 | Hsiao | B42F 1/02 24/545 |
| 6,976,719 B2 * | 12/2005 | Agayof | A45C 13/30 24/16 PB |
| 7,185,399 B2 * | 3/2007 | Logan | F16L 3/233 24/16 PB |
| 7,377,013 B2 * | 5/2008 | Cheung | A01G 9/128 24/16 PB |
| 7,578,532 B2 * | 8/2009 | Schiebler | G09F 3/0311 24/16 PB |
| 7,582,089 B2 * | 9/2009 | Schiebler | G09F 3/0311 24/16 PB |
| 7,651,169 B2 * | 1/2010 | Collins | A47D 15/006 297/468 |
| 8,049,629 B2 * | 11/2011 | Schiebler | G09F 3/0311 340/572.9 |
| 8,152,105 B2 | 4/2012 | Rossi | |
| 2003/0000052 A1 * | 1/2003 | Dossett | B65D 83/0088 24/453 |
| 2005/0028326 A1 * | 2/2005 | Logan | F16L 3/233 24/16 PB |
| 2006/0144951 A1 * | 7/2006 | Schiebler | G09F 3/0311 235/487 |
| 2008/0116326 A1 * | 5/2008 | Schiebler | G09F 3/0311 248/74.3 |
| 2009/0032646 A1 * | 2/2009 | Rossi | B64D 17/40 244/148 |

\* cited by examiner

RETAINER APPARATUS FOR USE WITH A PILOT CHUTE LAUNCHER AND METHOD FOR PACKING A PARACHUTE USING A PILOT CHUTE LAUNCHER AND RETAINER APPARATUS

TECHNICAL FIELD

The present invention pertains to the field of racecar accessories. More particularly, the present invention pertains to parachutes for racecars, specifically to apparatuses for and methods of packing parachutes for use in racecars.

BACKGROUND OF THE INVENTION

Drag racing is a popular sport involving the operation of motorized vehicles, typically motorcycles and racecars, at very high speeds over a relatively short straight distance. One type of drag racing car is known as a funny car, and this type of car easily exceeds 300 mph over a quarter mile track. Given the great speeds of these racecars over a relatively short distance, parachutes are used to help slow the cars down safely. After the race is over, the parachute must be collected and repacked for the next race.

Packing a drag racing parachute is a tedious chore. The parachute is folded then stowed into a parachute bag that has been premounted on the racecar, with the opening of the bag generally facing sideways or horizontally. The parachute bag is a large sack with a bottom plate, and four generally triangular flaps on top that when folded so as to cover the top of the bag opening, a vertice from each flap crosses over the center of the bag opening. In turn, each of these vertices is formed with a grommet, and all four grommets align when the flaps are folded over the top of the bag. The top flap features a permanently attached loop of cord. After the folded parachute is inserted into the parachute bag, this top flap is first folded over the open top of the parachute bag, followed by the other three flaps. The loop is pulled through all the grommets, and a retractable end of a release cable is inserted into the loop. Either before or after packing the parachute into the parachute bag, a parachute launcher is also packed inside the bag prior to closing the flaps and securing with the release cable. After the parachute and parachute launcher are packed, the flaps of the bag secured, and the retractable end of the release cable inserted into the loop, the parachute is ready for use.

There are currently three common types of parachute launchers used: spring launchers, air launchers, and pilot chute launchers. All three launchers work in a similar fashion: the driver engages a parachute release cable, which releases the packed parachute from its parachute bag. Spring and air launchers both push the parachute out of the parachute bag and away from the vehicle, and are more convenient for one-person use but they have two serious drawbacks: (1) they are much more expensive compared to the popular pilot chute launcher without significant functional improvement; and (2) they are bulky when mounted. The pilot chute launcher works differently: the pilot chute launcher is permanently tethered to the parachute and is packed last into the parachute bag, and when the release cable is pulled by the racecar driver, the pilot chute launcher springs out of the bag first, pulling the tethered parachute with it. The pilot chute launcher is more economical than the spring and air launchers, but has one main drawback: it is awkward to pack as the pilot chute launcher is essentially a large, funnel-shaped spring attached to and placed over a parachute packed into a parachute bag, especially when the parachute bag is mounted to the racecar as the bag opening generally faces sideways or horizontally away from the racecar. The bulky spring design thus requires two people to pack the parachute bag: one person manually compresses the spring evenly against the packed parachute, while the other person secures the parachute bag flaps.

What is needed is an apparatus that evenly compresses the pilot chute launcher while packing a parachute, and a method of packing a parachute that allows a single person to quickly and easily pack the parachute along with the pilot chute launcher into a parachute bag.

DISCLOSURE OF THE INVENTION

Accordingly, in a first aspect of the invention, an apparatus for packing a parachute and a pilot chute launcher into a parachute bag comprises a plate with an array of slots formed in parallel on opposing sides of the plate. A pair of extensions, each extension having a head at one end, an opposed wing at another end and a body between the head and the wing, is inserted into opposed slots, the slots sized and shaped to receive the wing and the body to insert into the slot but not the head. The invention further provides for a pair of tabs, each tab having a receiving notch formed into the tab, each tab pre-installed onto a bottom plate of the parachute bag and on opposing sides of the bag. The notches are sized and shaped to accommodate a portion of the body immediately above the wing.

Still in accord with the first aspect of the invention, the extension is further comprised of at least two wings held in spaced apart relationship by a recess, the recess sized and shaped to receive the notch.

Still in accord with the first aspect of the invention, the plate is formed with three pairs of slots centered on either side of the plate, the spacing of each pair of slots corresponding with a parachute bag width when fitted with a parachute.

Further still in accord with the first aspect of the invention, the apparatus is made of 6016 T6 aluminum.

Even further still also in accord with the first aspect of the invention, the plate is comprised of a first dimension measuring at least four inches, a second dimension measuring at least twelve inches, and a thickness of less than one inch, and the extension is at least eight inches long.

In a second aspect of the invention, a method for packing a racecar parachute using a pilot chute launcher and a retainer apparatus comprising a plate, a pair of tabs, and a pair of extensions, is comprised of the steps of affixing the tabs to opposed sides of the parachute bag bottom plate, inserting the extension into opposing slots, inserting the parachute into the parachute bag, positioning the pilot chute launcher on top of the parachute, placing the retainer apparatus on top of the pilot chute launcher, and coupling the extension recesses into the corresponding tab notches, securing a top flap and bottom flap of the parachute bag by pulling a closing loop through a grommet formed in each flap, uncoupling the extensions from the tabs and removing the extensions from the slots, removing the plate, securing opposed side flaps of the parachute bag over the top flap and bottom flap by pulling the closing loop through grommets in each side flap, and securing a retractable end of a release cable into the closing loop.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
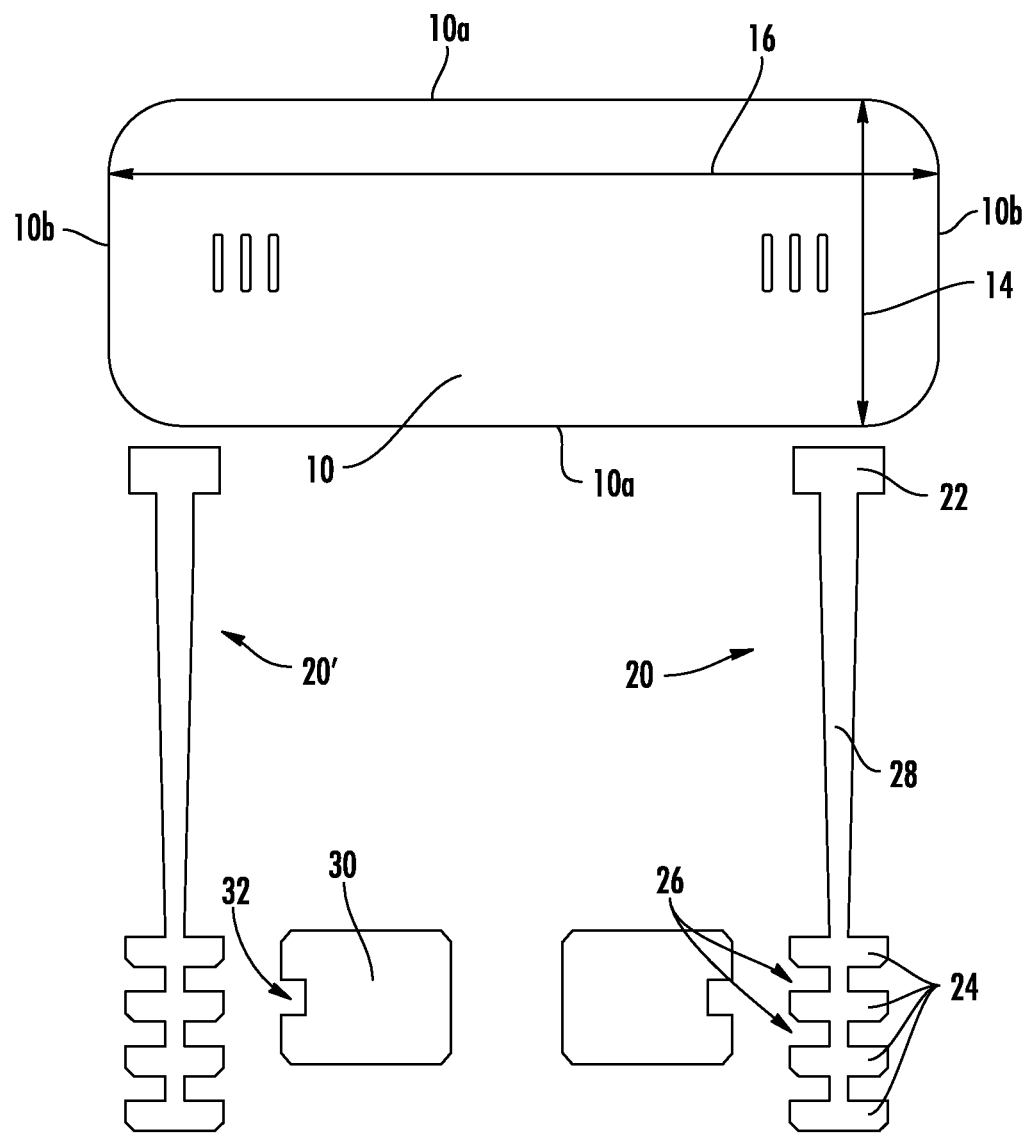
FIG. 1 is a top view of a retainer apparatus according to the invention.

The following is a list of reference labels used in the drawings to label components of different embodiments of the invention, and the names of the indicated components.
100 retainer apparatus according to the invention
10 plate
10a first side
10b second side
12 slot
14 first dimension or height
16 second dimension or width
18 plate-extension assembly
20 first extension
20' second extension
22 head
24 wing
26 recess
28 body
30 tab
32 notch
40 pilot chute launcher
42 parachute bag
42a grommet
42b top flap of parachute bag
42c bottom flap of parachute bag
42d side flap of parachute bag
42e tether cord
44 parachute
44a racecar tether
46 bottom plate
47 pull up cord
48 closing loop
48 release cable
49a retractable end (of release cable)
50 mounting bracket
60 method of packing a parachute using the invention
60a affixing tabs
60b inserting extension into plate
60c packing parachute into parachute bag
60d positioning pilot chute launcher
60e positioning plate with extensions over pilot chute launcher
60f engaging recesses and notches
60g folding top and bottom parachute bag flaps
60h disengaging and removing extensions
60i removing plate
60j folding side flaps over
60k inserting retractable end of release cable
70 user (human)

DETAILED DESCRIPTION

Figure 2:
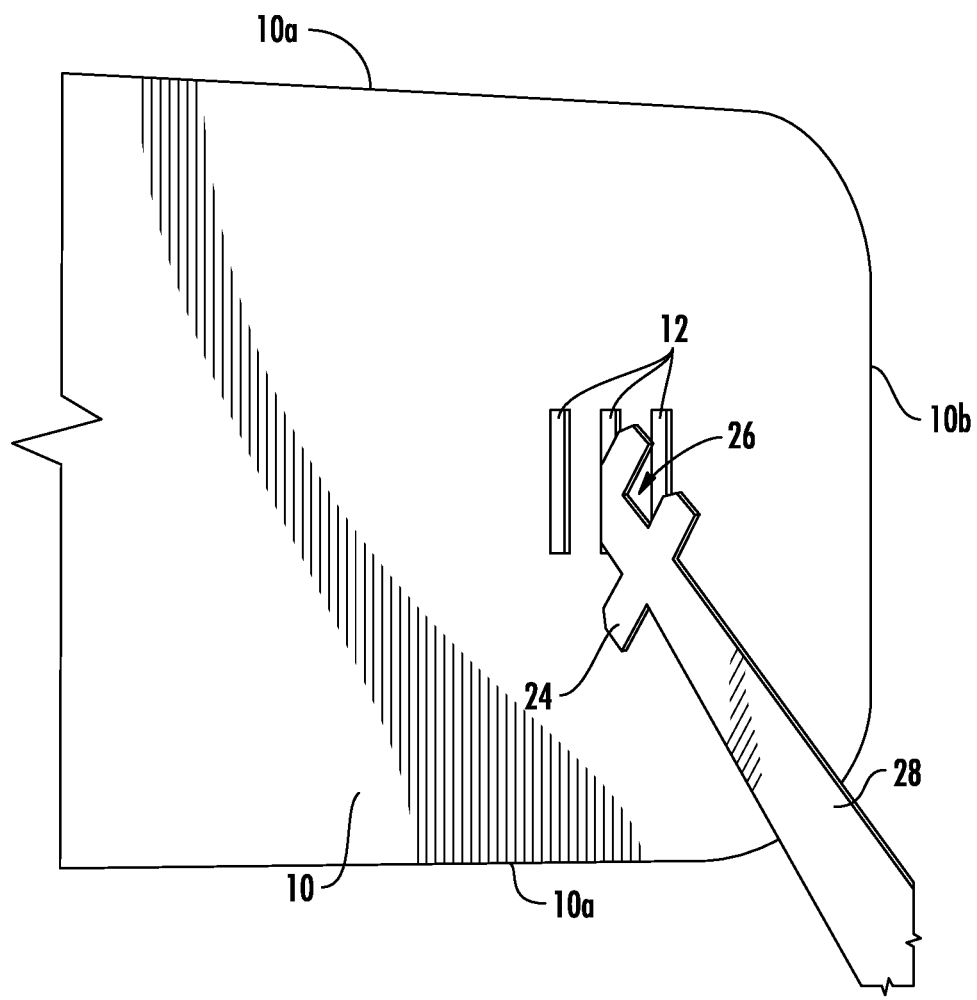
FIG. 2 is a partial top view of the retainer apparatus in FIG. 1, shown with an extension partially inserted into a slot of a slotted plate.
Figure 3:
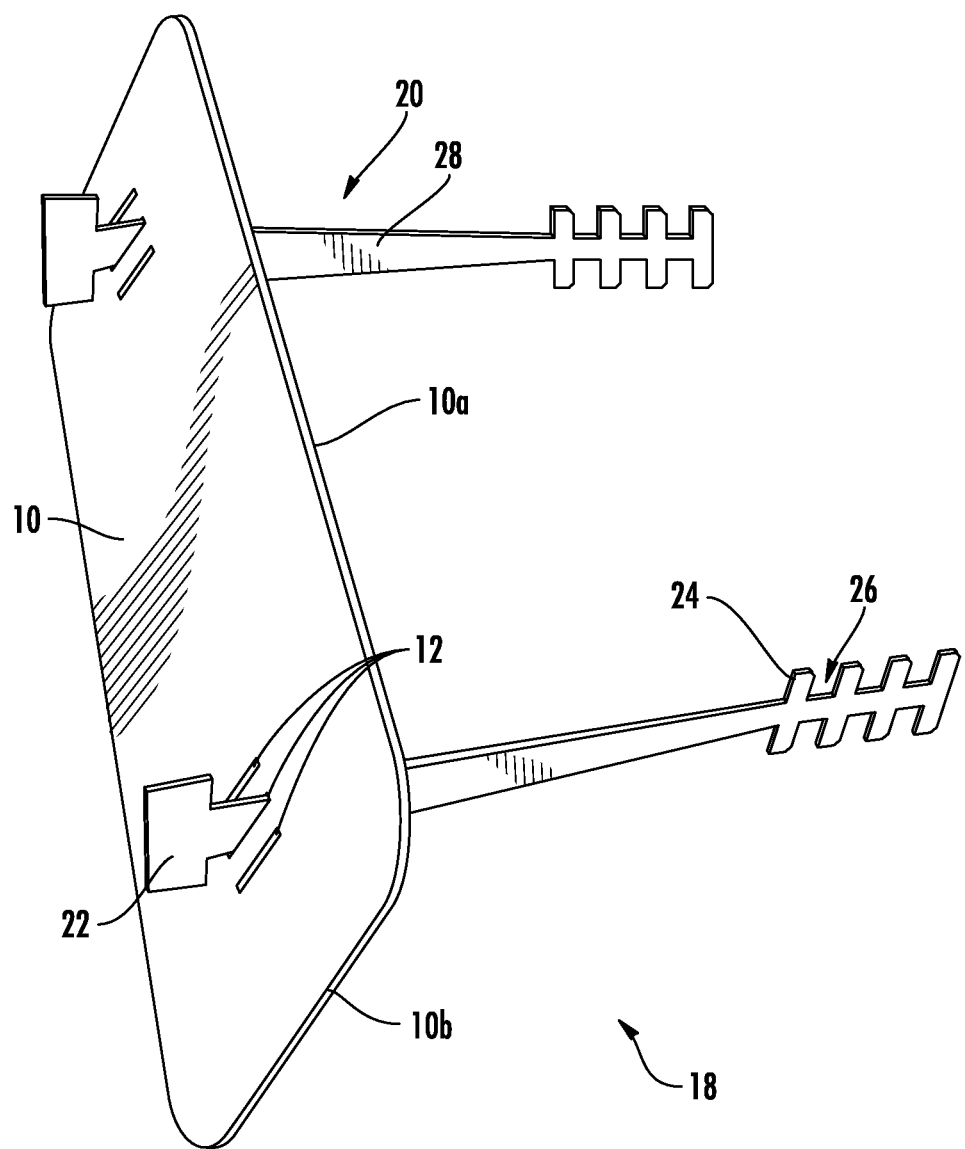
FIG. 3 is a perspective view of the retainer apparatus of FIG. 1 as it would appear fully assembled.
Figure 4:
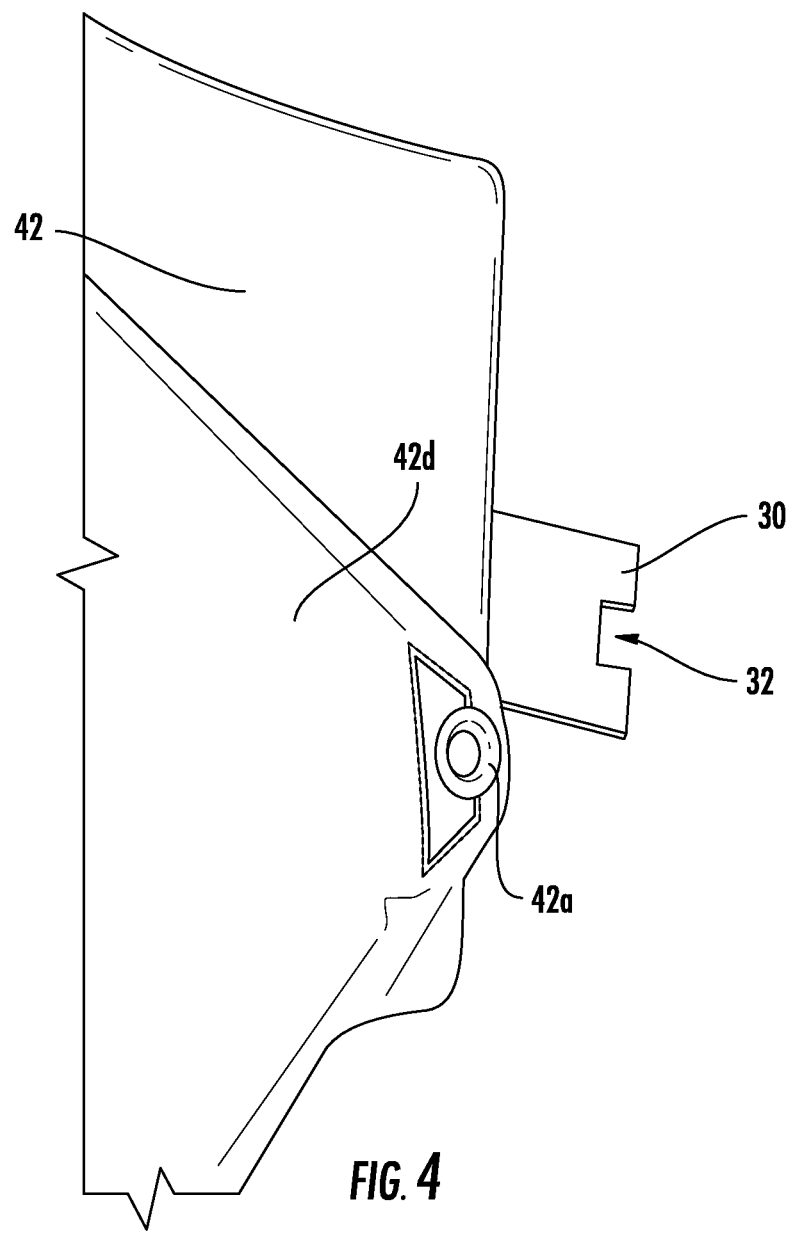
FIG. 4 is a perspective view of a parachute bag mounted to a racecar bracket, the parachute bag shown with an installed tab.
Figure 5:
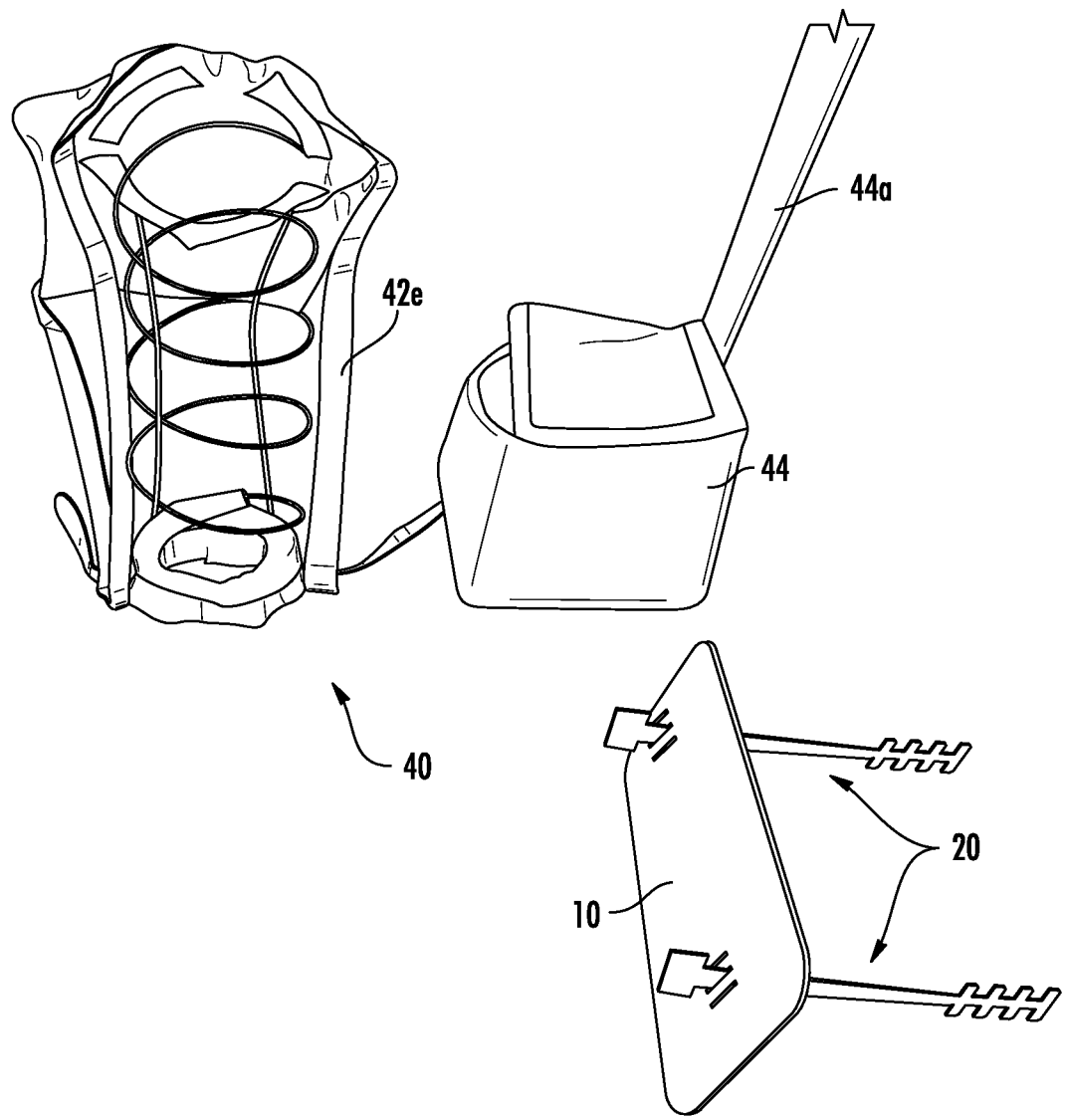
FIG. 5 is a perspective view of a pilot chute launcher, a parachute, and the retainer apparatus of FIGS. 1-3.
Figure 6:
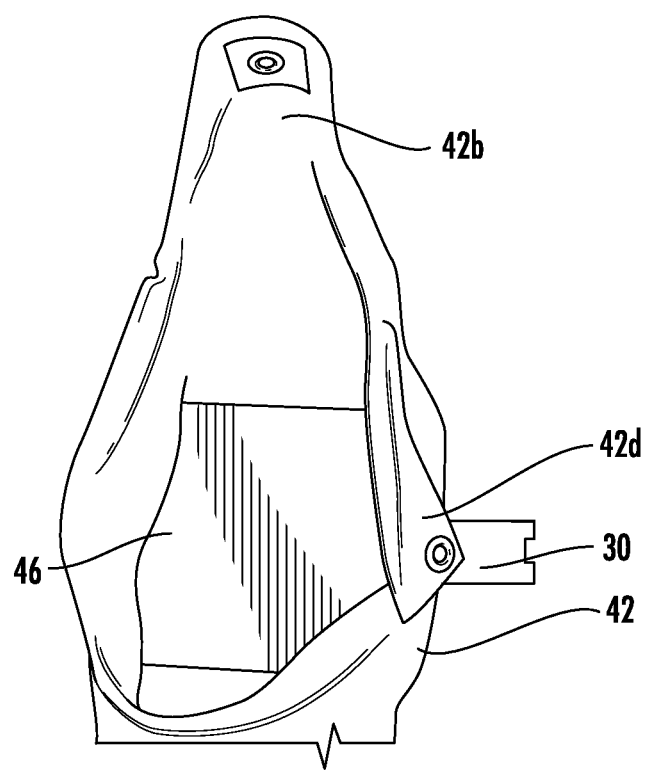
FIG. 6 is a perspective view of an empty parachute bag, shown with a bottom bag plate.

A retainer apparatus according to the invention is shown in FIGS. 1-3, and a method of using the retainer apparatus is shown in FIGS. 4-16.

Looking now at FIGS. 1-3, the retainer apparatus 100 is comprised of a plate 10, a first extension 20, a second extension 20' that is identical to the first extension, and two tabs 30. The plate 10 is typically rectangular or elongated in shape, with a first dimension 14 approximately one third the length of a second dimension 16. In the Figures, the first dimension is approximately 6 inches, corresponding to a height, and the second dimension is approximately 16 inches, corresponding to a width. The plate is formed with pairs of spaced apart slots 12 formed on opposite sides of the plate 10 and oriented so that each slot opening is parallel to the first dimension. In the Figures, a typical array of slots is shown, with six total slots formed into the plate 10. The array of slots are symmetrical. Each pair of slots is centered about three inches from a first side 10a of the plate 10, the slot itself measuring approximately 1.125 inches long and 0.125 inches wide. The first pair of slots, that is, pair closest to a center of the plate, are about 4.75 inches from the center, the second pair of slots are about 5.25 inches from the center, and the third pair of slots are about 5.75 inches from the center of the plate.

Each extension 20 20' is comprised of a head 22 at one end of the extension 20 20', a series of wings 24 alternating with recesses 26 at an opposed end of the extension, and a body 28 joining the head with the wings and recesses. In the Figures, four wings and three recesses are shown. The body 28 is shown as generally tapering from the head 22 to the first wing 24. The head 22 measures approximately two inches wide, and one inch tall, and the 24 are smaller, with a height of about 0.44 inches, and a width less than that of the head. Each recess is about 0.44 inches tall and about 0.5 inches deep. The extension 20 20' measures about 11.25 inches long. These dimensions are for a typical embodiment of the retainer apparatus for use with a standard-sized parachute bag, parachute, and pilot chute launcher for a racecar, however the inventor notes that as these dimensions correspond to commonly used parachute and parachute bag sizes, larger or smaller parachute bags would require a proportionally larger or smaller retainer apparatuses, and thus the given dimensions are suggestive only of typical proportions and not meant to limit the retainer apparatus to just the dimensions listed here.

Figure 7:
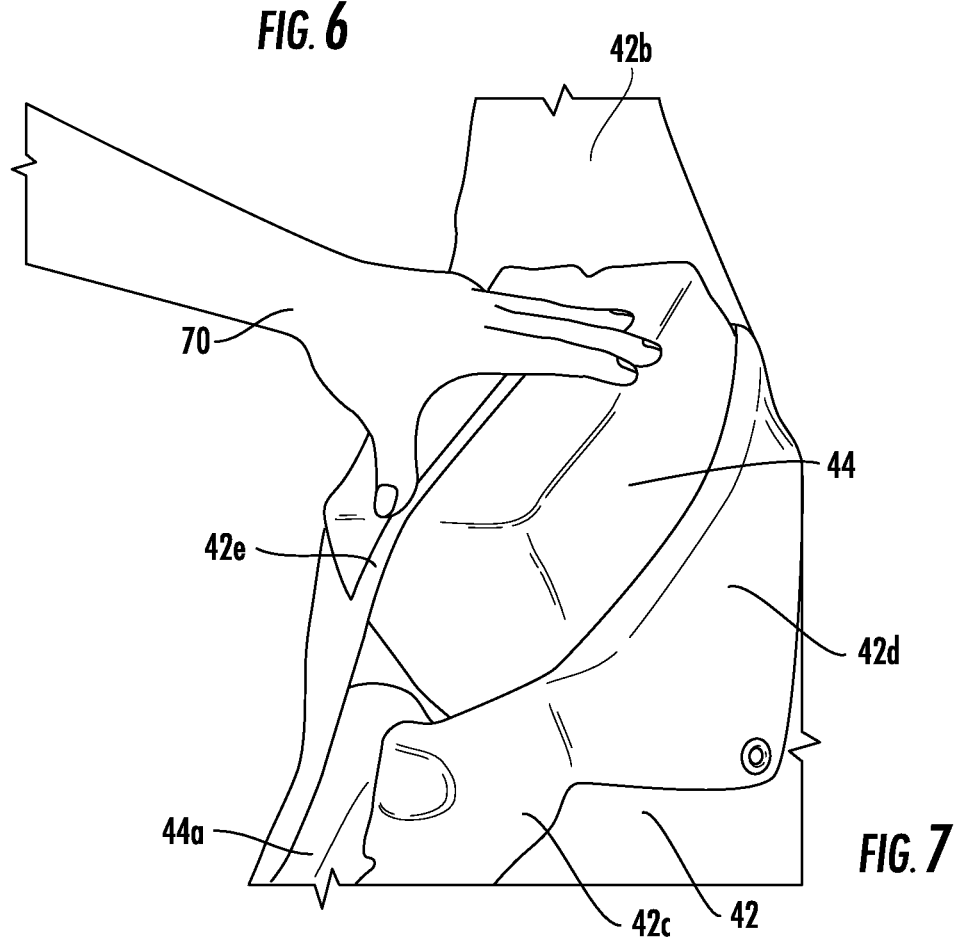
FIGS. 7-13 are perspective views of the retainer apparatus according to the invention shown in various stages of operation as used with a parachute bag, the parachute, and the pilot chute launcher.
Figure 8:
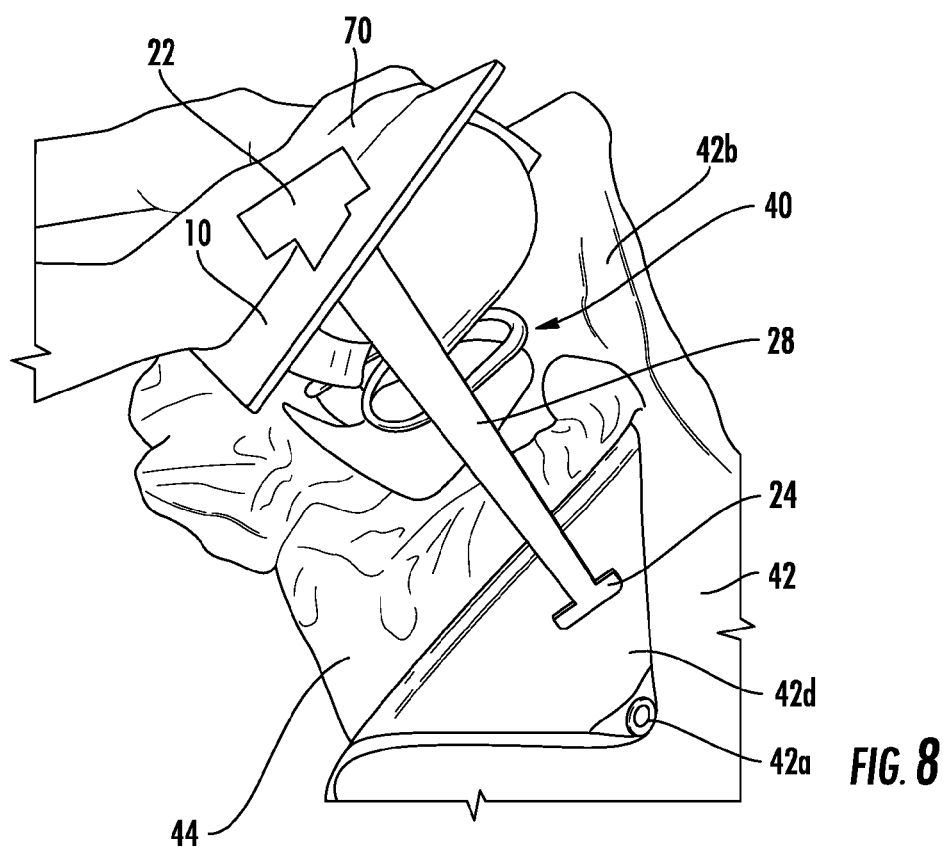
Figure 9:
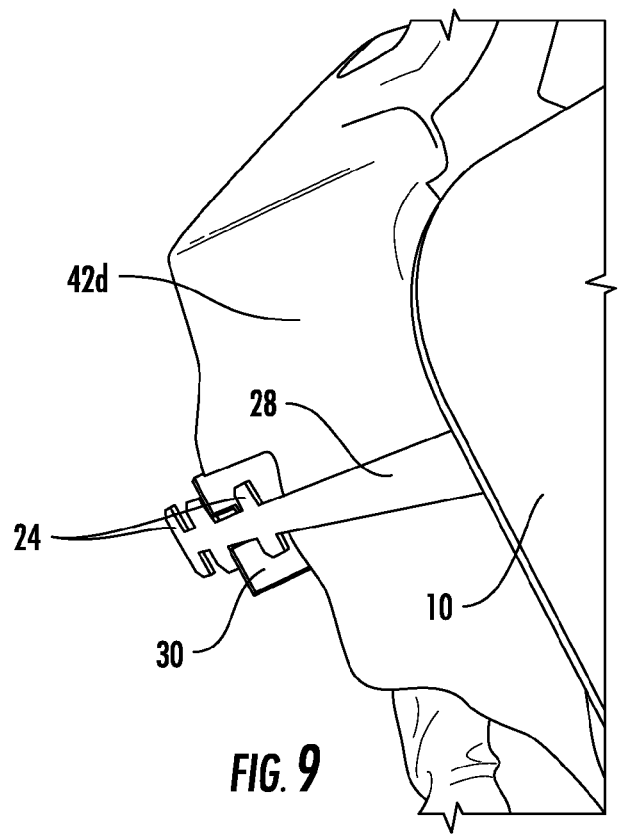
Figure 10:
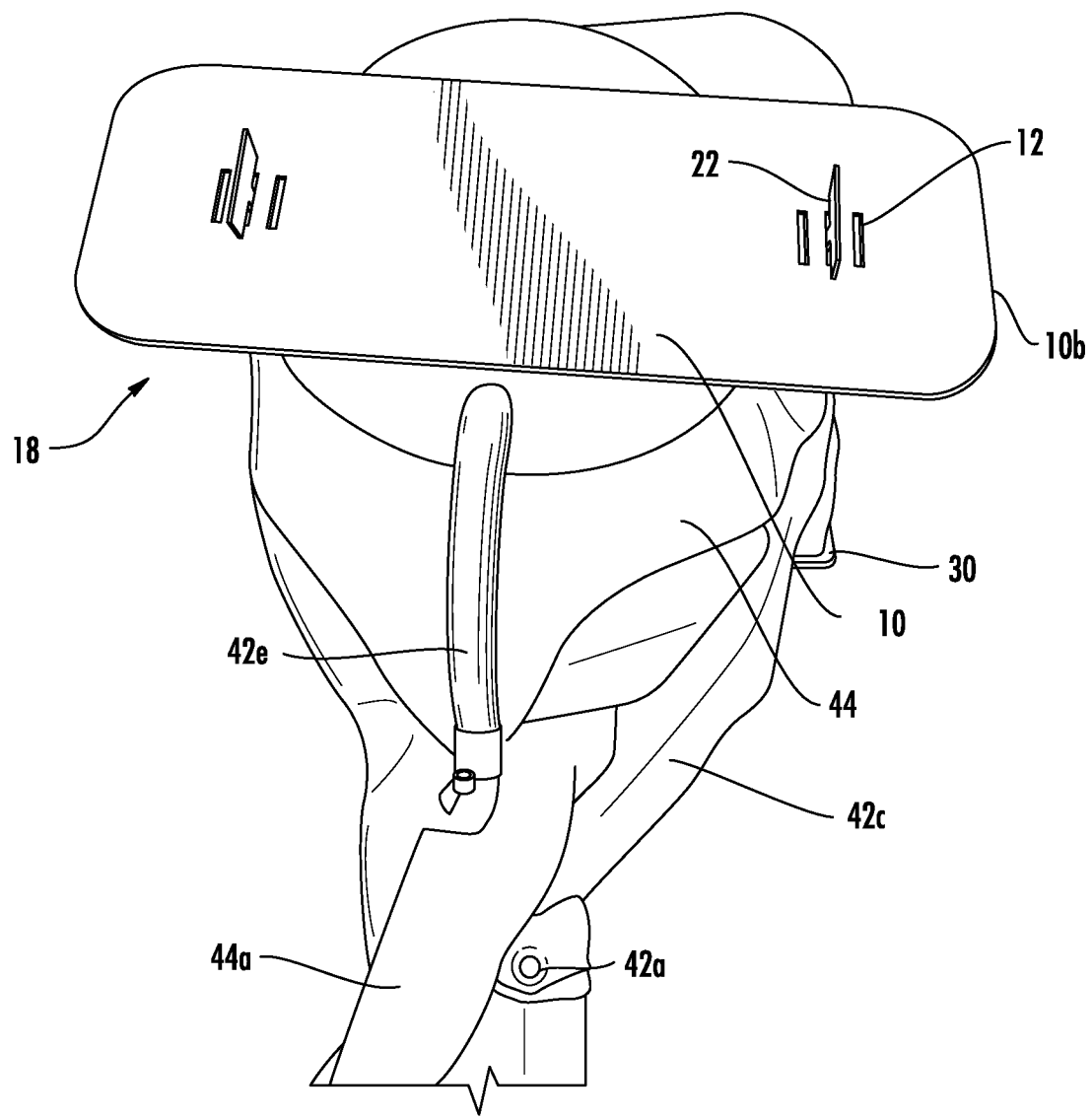
Figure 14:
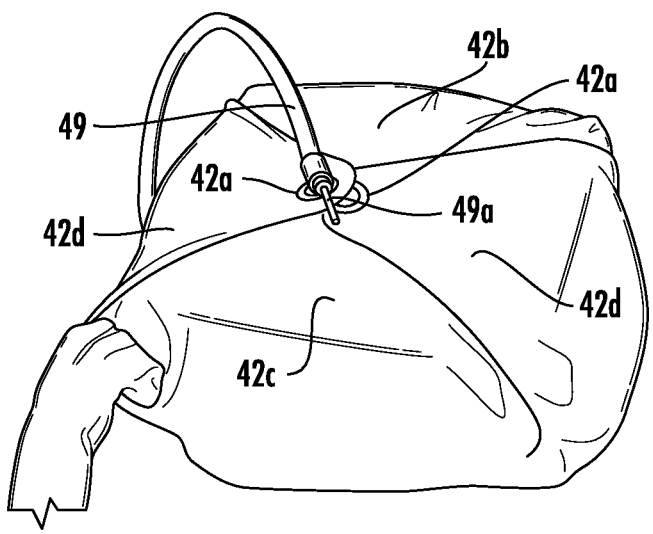
FIG. 14 is a perspective view of a packed parachute ready for use.
Figure 15:
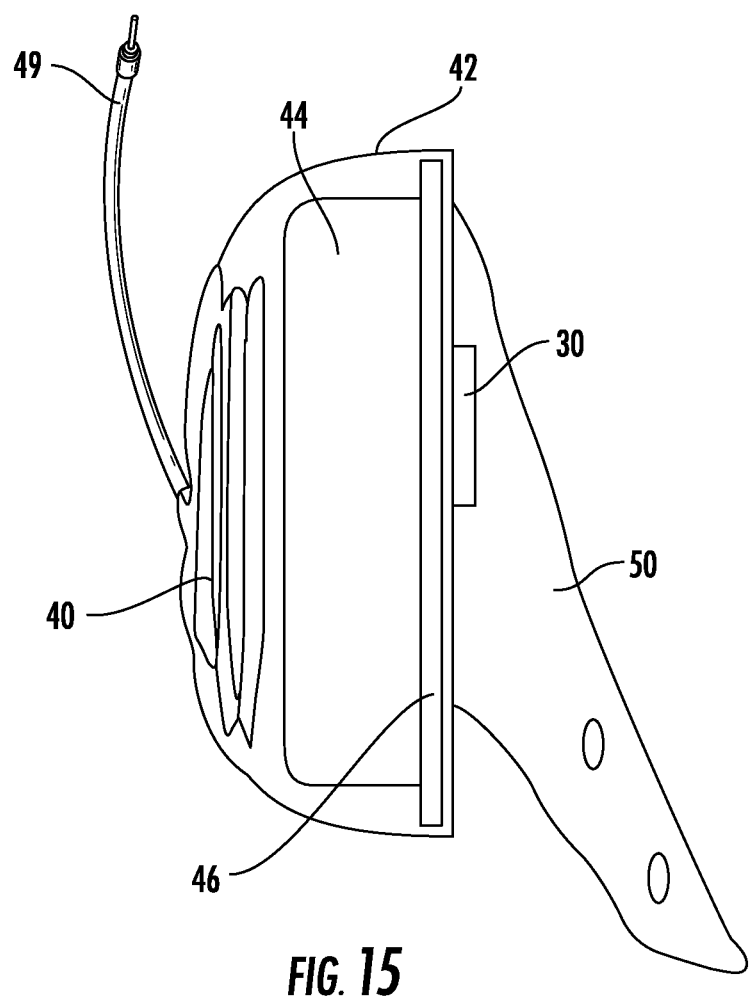
FIG. 15 is a cross sectional, side elevational view of a packed parachute as it would appear mounted to a racecar bracket.
Figure 16:
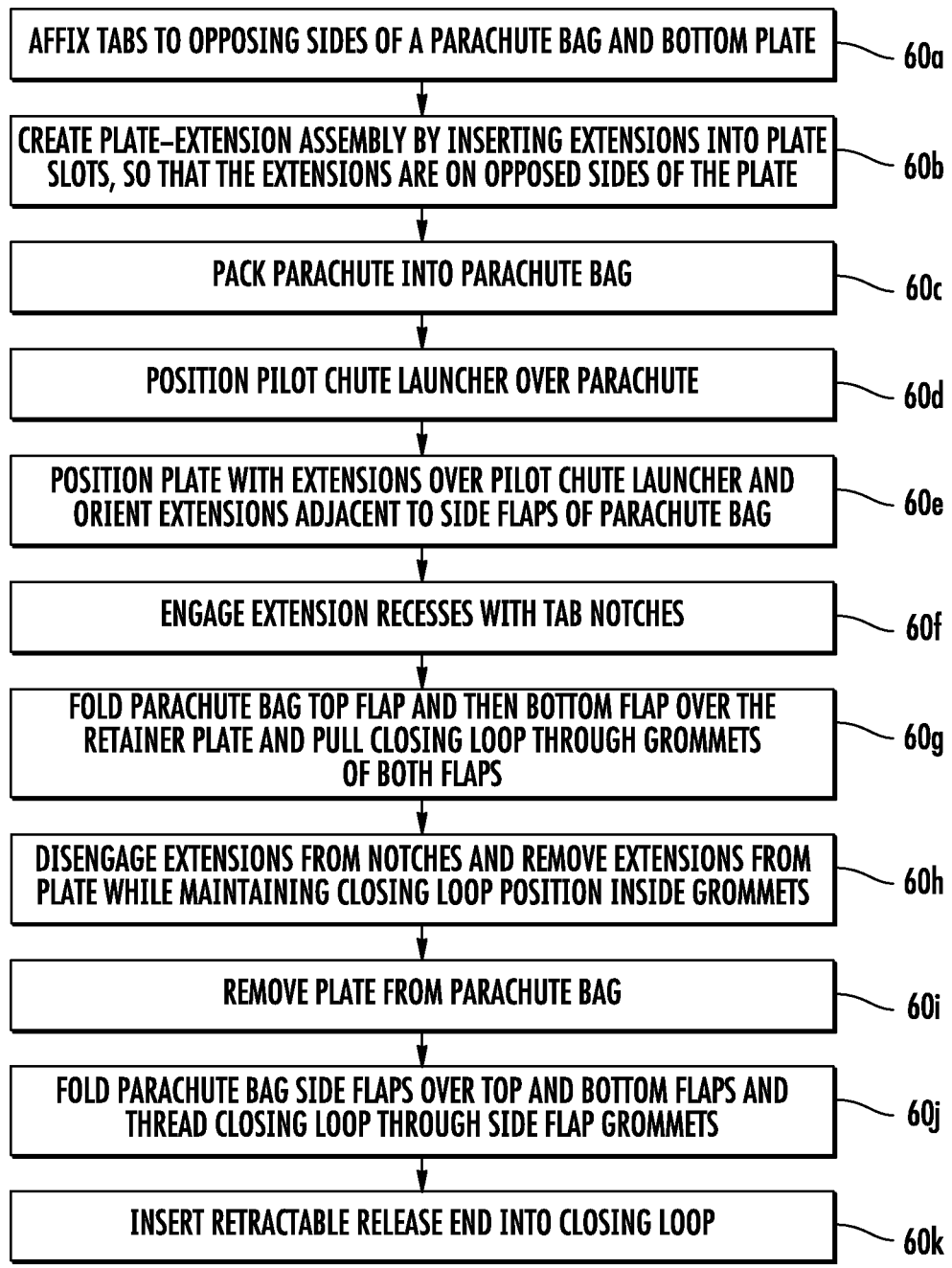
FIG. 16 is a diagrammatic representation of a method of packing a parachute using the invention and a pilot chute launcher.

Looking now at FIGS. 4-16, to use the retainer apparatus 100, the tabs 30 are affixed 60a to a bottom plate 46 of a parachute bag 42, on opposing sides of the parachute bag, typically by screwing the tab 30 through the parachute bag and directly into the bottom plate 46 (FIGS. 4, 6 and 15-16). The tabs 30, once installed, are typically not removed. The parachute bag 42 is removably affixed to a mounting bracket 50 (FIG. 15), the mounting bracket mounted to a racecar (not shown). The first extension 20 and second extension 20' are inserted into opposing slots 12 of the plate 10, creating a plate-extension assembly 18. A parachute 44 is then packed 60C into the parachute bag 42 (FIGS. 7 and 16). A pilot chute launcher 40 is positioned 60d on top of the parachute 44. The plate-extension assembly 18 is positioned 60e on top of the pilot chute launcher 40 (FIGS. 8 and 16). Pressing down on the plate 10, the pilot chute launcher 40 is compressed, and a user 70 engages 60f each recess 26 into the corresponding notch 32 of the tabs 30, holding down the plate 10 with one hand and mating each extension consecutively (FIGS. 8-9, 16). The first wing 26 rests under the notch 32, and the head 22 of the extension 20 20' rests on top of the plate 10. If necessary, the user 70 can adjust the retainer apparatus 100 so as to fully compress the pilot chute launcher 40 by mating the notch 32 with the recess closest to the head 22, and doing so on either side so as to evenly compress the pilot chute launcher spring (FIG. 10).

Figure 11:
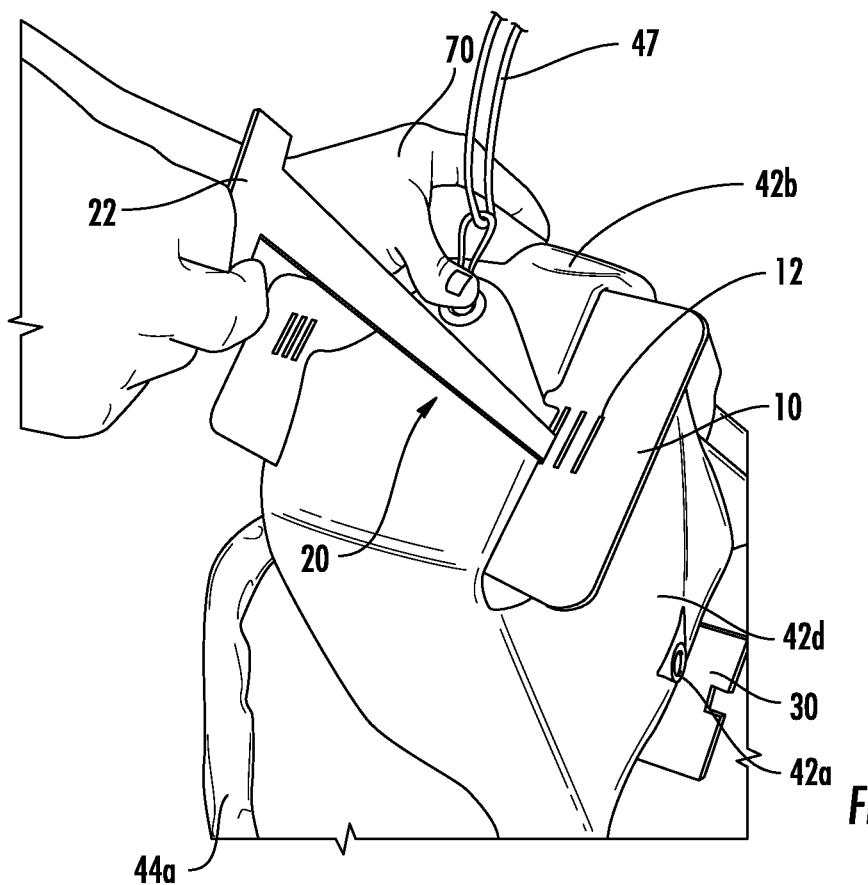
Figure 12:
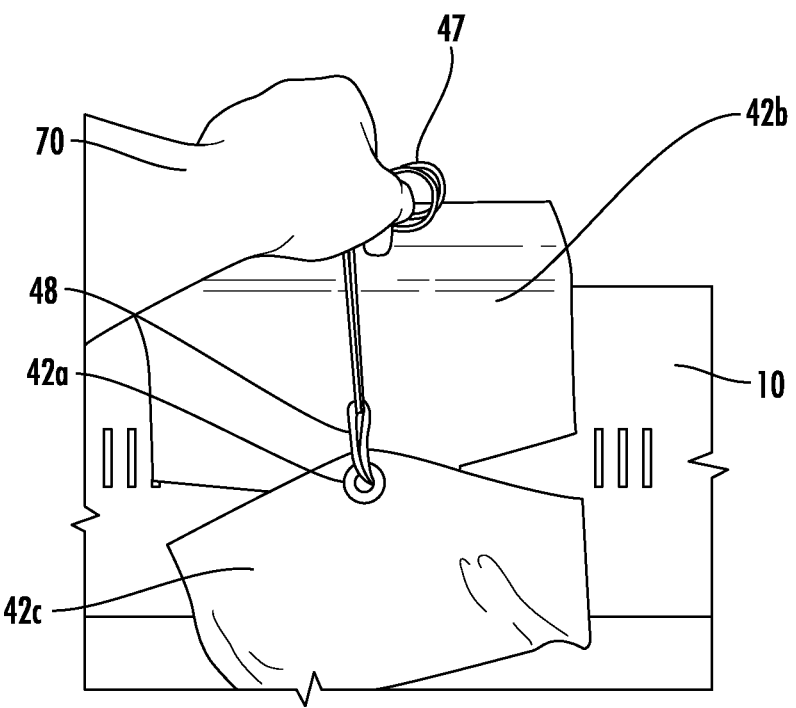
Figure 13:
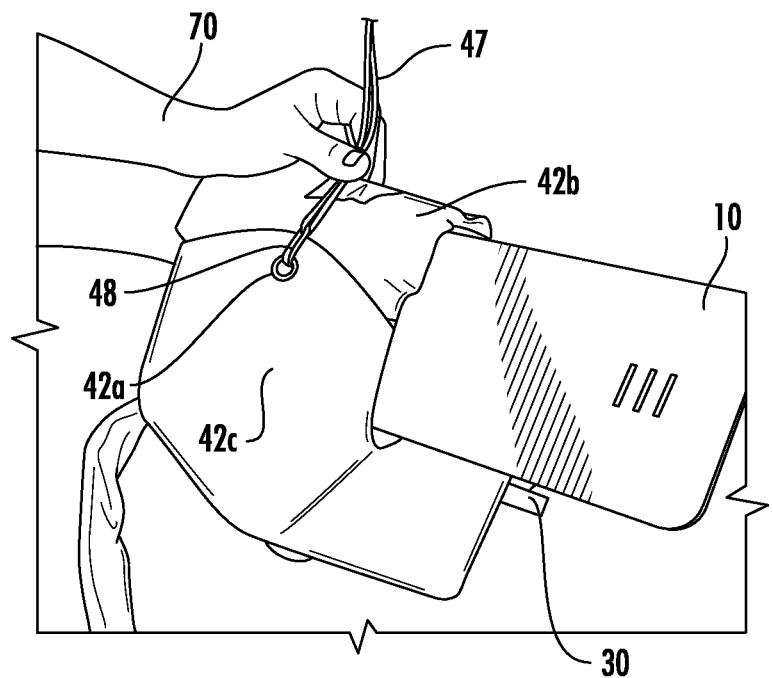

Turning now to FIGS. 11 and 16, the user 70 folds a top flap 42b and a bottom flap 42c of the parachute bag 42 over the plate 10 and secures the flaps 42b 42c, removing each extension 20 20' from the plate 10. The top flap 42b is further comprised of a closing loop 48 that is permanently affixed to the top flap 42b, and this top flap is first folded 60g over the plate 10, followed by the bottom flap 42c. The closing loop 48 is pulled through each grommet 42a formed in a vertice of each flap 42b 42c, the user 70 pulling the closing loop 48 through the grommets 42a using a pull up cord 47 threaded through the closing loop 48. The extensions 20 20' are removed 60h, leaving only the plate 10 still inside the folded and secured flaps 42b 42c (FIG. 12). In FIGS. 13-14, and 16, the user 70 removes 60i the plate 10 from the parachute bag 42, and folds 60j the side flaps 42d over the already folded top and bottom flaps, and using the pull up cord 47, pulls the closing loop 48 through the remaining grommets for the side flaps 42d, and finally secures the closing loop 48 by inserting 60k a retractable end 49a of a release cable 49 into the closing loop 48. The parachute is now ready for deployment.

FIG. 15 is a cross sectional, side elevational view of a typical packed parachute using a pilot chute launcher, showing the relationship of the pilot chute launcher to the parachute as well as the location of the tabs 30. The pilot chute launcher 40 must be tightly and evenly compressed against the packed parachute 44, and the retainer apparatus 100 allows the single user 70 to evenly and easily compress the tall, wobbly pilot chute launcher 40 into the parachute bag 42.

The retainer apparatus 100 is typically made of metal, preferably 6016 T6 aluminum for strength and durability, however other rigid, strong materials such as structural plastic with optional ribs may also be used. The inventor uses 0.090 inch thick 6016 T6 aluminum, and notes that the plate 10 is ideally less than one inch thick because a larger thickness will interfere with the ability to secure the parachute bag flaps when fully packed. Metal is an ideal material combining strength with thinness, and the inventor notes that while plastics may be used, a plastic plate thin enough to use may not be durable over the long term. It is also possible to create a smaller, more portable retainer apparatus by hinging the plate 10 and then sliding small latches over the hinged area to prevent the plate from bending along the hinge.

It is to be understood that the above-described arrangements are only illustrative of the application of the principles of the present invention. Numerous modifications and alternative arrangements may be devised by those skilled in the art without departing from the scope of the present invention. For instance, the plate 10 is elongated so that the user can grasp opposing sides 10b as handles, and in some embodiments, actual handles or cut outs could also be formed and not alter the functionality of the invention. The inventor also notes that the number of wings 24 and recesses 26 shown on the extensions are one embodiment, and a single wing at a terminal end of each extension is also possible. Multiple wings and recesses however allow for adjustments in packing and allows the user to gradually adjust the compression of the pilot chute launcher, as needed, so as to obtain a tighter, more compact parachute package.

What is claimed is:

1. A retainer apparatus for simultaneously packing both a pilot chute launcher having a spring that can be compressed and uncompressed and a race car parachute into a parachute bag having a bottom plate and a bottom width dimension, the retainer apparatus comprising:
   a plate having a first dimension and a second dimension;
   a pair of extensions; and
   a pair of tabs;
   wherein the plate is further comprised of a pair of opposed slots, each slot of the pair formed on opposite sides of a center of the plate such that a distance between the opposed slots approximates the bottom width dimension of the parachute bag;
   wherein each extension of the pair of extensions is further comprised of a flat body having a first end and a second end, a head formed at the first end and a flat wing formed at the second end, wherein the flat body and flat wing of each extension exist in a same linear plane;
   wherein each extension has a body length no shorter than a combined length of the race car parachute and a compressed spring of the pilot chute launcher, all measured when the race car parachute and the pilot chute launcher are packed inside the parachute bag;
   wherein each slot is sized and shaped so as to permit insertion of the wing but not of the head, and
   wherein each tab is further formed with a notch sized and shaped to accommodate a portion of the body immediately above the wing;
   wherein each tab is configured to be secured through opposing sides of the parachute bag into the bottom plate and positioned such that a distance measured between the notches of each tab approximates the distance between the pair of opposed slots; and
   wherein the plate, the pair of extensions, the bottom plate, and the pair of tabs are rigid and inflexible.

2. The retainer apparatus of claim 1, wherein the extension is further comprised of at least two wings held in spaced apart relationship by a recess, the recess sized and shaped to receive the notch.

3. The retainer apparatus of claim 1, wherein the plate is formed with three pairs of slots centered on either side of the plate and corresponding with the parachute bag width when fitted with the parachute.

4. The retainer apparatus of claim 1, wherein the retainer apparatus is made of 6016 T6 aluminum.

5. The retainer apparatus of claim 1, wherein the first dimension is at least four inches.

6. The retainer apparatus of claim 1, wherein the second dimension is at least 12 inches.

7. The retainer apparatus of claim 1, wherein the extension is at least eight inches long.

8. The retainer apparatus of claim 1, wherein the plate is less than one inch thick.

9. A method for packing a parachute for a racecar, the method using a pilot chute launcher and a retainer apparatus comprising a plate, a pair of tabs, and a first extension and a second extension, the method comprising:

affixing the pair of tabs onto opposing sides of the parachute bag such that the tabs are positioned on an outside portion of the parachute bag and secured through the parachute bag and into a bottom plate of the parachute bag;

creating a plate extension assembly by inserting the first extension and the second extension into opposing slots formed in the plate;

packing the parachute into the parachute bag;

positioning the pilot chute launcher over the parachute;

positioning the plate extension assembly over the parachute;

engaging a recess of each extension with a notch of each tab;

folding a top flap and then a bottom flap over the plate and secure flaps over the plate with a closing loop;

disengaging the recesses from the notches and removing the extensions from the plate;

removing the plate from the parachute bag;

folding a pair of side flaps over the top flap and the bottom flap and securing all flaps with the closing loop; and inserting a retractable release end into the closing loop.

10. The method of claim 9, using the retainer apparatus of claim 1.

* * * * *